United States Patent [19]

Archer

[11] Patent Number: 5,592,059
[45] Date of Patent: Jan. 7, 1997

[54] SYSTEM AND METHODS FOR DRIVING A BLOWER WITH A MOTOR

[75] Inventor: William R. Archer, Fort Wayne, Ind.

[73] Assignee: General Electric Company, Fort Wayne, Ind.

[21] Appl. No.: 348,514

[22] Filed: Dec. 1, 1994

Related U.S. Application Data

[63] Continuation-in-part of Ser. No. 889,708, May 27, 1992.

[51] Int. Cl.$^6$ .................................................... H02P 7/00
[52] U.S. Cl. .......................... 318/254; 388/934; 318/432; 62/215
[58] Field of Search ...................................... 318/254, 471, 318/439, 138, 55, 66, 68, 98, 772, 774, 806; 62/115, 160, 180, 208, 211, 215; 388/909, 929, 930, 934, 432

[56] References Cited

U.S. PATENT DOCUMENTS

| | | | |
|---|---|---|---|
| 4,015,182 | 3/1977 | Erdman | 318/334 |
| 4,250,544 | 2/1981 | Alley | 364/110 |
| 4,338,791 | 7/1982 | Stamp, Jr. et al. | 62/160 |
| 4,346,434 | 8/1982 | Morinaga | 364/183 |
| 4,390,826 | 6/1983 | Erdman et al. | 318/439 |
| 4,415,844 | 11/1983 | Mendenhall et al. | 318/254 |
| 4,459,519 | 7/1984 | Erdman | 318/254 |
| 4,495,450 | 1/1985 | Tokizaki et al. | 318/138 |
| 4,500,821 | 2/1985 | Bitting et al. | 318/254 |
| 4,540,921 | 9/1985 | Boyd, Jr. et al. | 318/254 |
| 4,636,936 | 1/1987 | Boyd, Jr. et al. | 364/148 |
| 4,642,536 | 2/1987 | Boyd, Jr. et al. | 318/254 |
| 4,642,537 | 2/1987 | Young | 318/254 |
| 4,648,551 | 3/1987 | Thompson et al. | 236/49 |
| 4,667,480 | 5/1987 | Bessler | 62/180 |
| 4,682,473 | 7/1987 | Rogers, III | 62/89 |
| 4,688,547 | 8/1987 | Ballard et al. | 126/116 A |
| 4,712,050 | 12/1987 | Nagasawa et al. | 318/254 |
| 4,735,055 | 4/1988 | Taylor et al. | 62/115 |
| 4,743,815 | 5/1988 | Gee et al. | 318/254 |
| 4,752,724 | 6/1988 | Radziwill et al. | 318/254 |
| 4,757,241 | 7/1988 | Young | 318/254 |
| 4,773,587 | 9/1988 | Lipman | 236/11 |
| 4,806,833 | 2/1989 | Young | 318/335 |
| 4,806,839 | 2/1989 | Nagato et al. | 318/798 |
| 4,819,441 | 4/1989 | Hanson | 62/160 |
| 4,860,231 | 8/1989 | Ballard et al. | 364/571 |
| 4,860,552 | 8/1989 | Beckey | 62/158 |
| 4,868,467 | 9/1989 | Davis | 318/254 |
| 4,876,491 | 10/1989 | Squires et al. | 318/138 |
| 4,879,502 | 11/1989 | Endo et al. | 318/723 |

(List continued on next page.)

FOREIGN PATENT DOCUMENTS

87/03433  4/1987  WIPO.

OTHER PUBLICATIONS

Soviet Patent Abstracts, S–X sections, week 8945, Dec. 20, 1989.

*Primary Examiner*—Jonathan Wysocki
*Attorney, Agent, or Firm*—Ralph E. Krisher, Jr.

[57] ABSTRACT

A system for driving a blower of a heating, ventilating, and/or air conditioning (HVAC) system. The blower discharges heated or cooled air to a space for conditioning the air in the space by changing its temperature. A motor drives the blower at a speed or torque defined by a motor control signal thereby to control air flow rate of the HVAC system. The system includes a temperature sensor generating a temperature signal representative of the temperature of the air discharged to the space by the blower. In response to the temperature signal, a control circuit generates the motor control signal to cause the motor to operate at a minimum speed or torque until the temperature of the discharged air as represented by the temperature signal reaches a reference temperature. After the temperature of the discharged air reaches the reference temperature, the control circuit generates the motor control signal to control the motor speed or torque as a function of the difference between the temperature of the discharged air and the reference temperature whereby the air flow rate of the HVAC system is increased as the temperature difference increases.

40 Claims, 4 Drawing Sheets

U.S. PATENT DOCUMENTS

| | | | |
|---|---|---|---|
| 4,950,918 | 8/1990 | O'Breartuin et al. | 307/242 |
| 4,958,269 | 9/1990 | Gritter | 364/153 |
| 5,179,998 | 1/1993 | Des Champs | 62/90 X |
| 5,197,667 | 3/1993 | Bowsky et al. | 62/180 |
| 5,233,275 | 8/1993 | Danino | 318/254 |
| 5,275,012 | 1/1994 | Dage et al. | 62/208 |
| 5,309,730 | 5/1994 | Strand | 62/228.4 |
| 5,397,970 | 3/1995 | Rowlette et al. | 318/254 |
| 5,410,230 | 4/1995 | Bessler et al. | 318/471 |

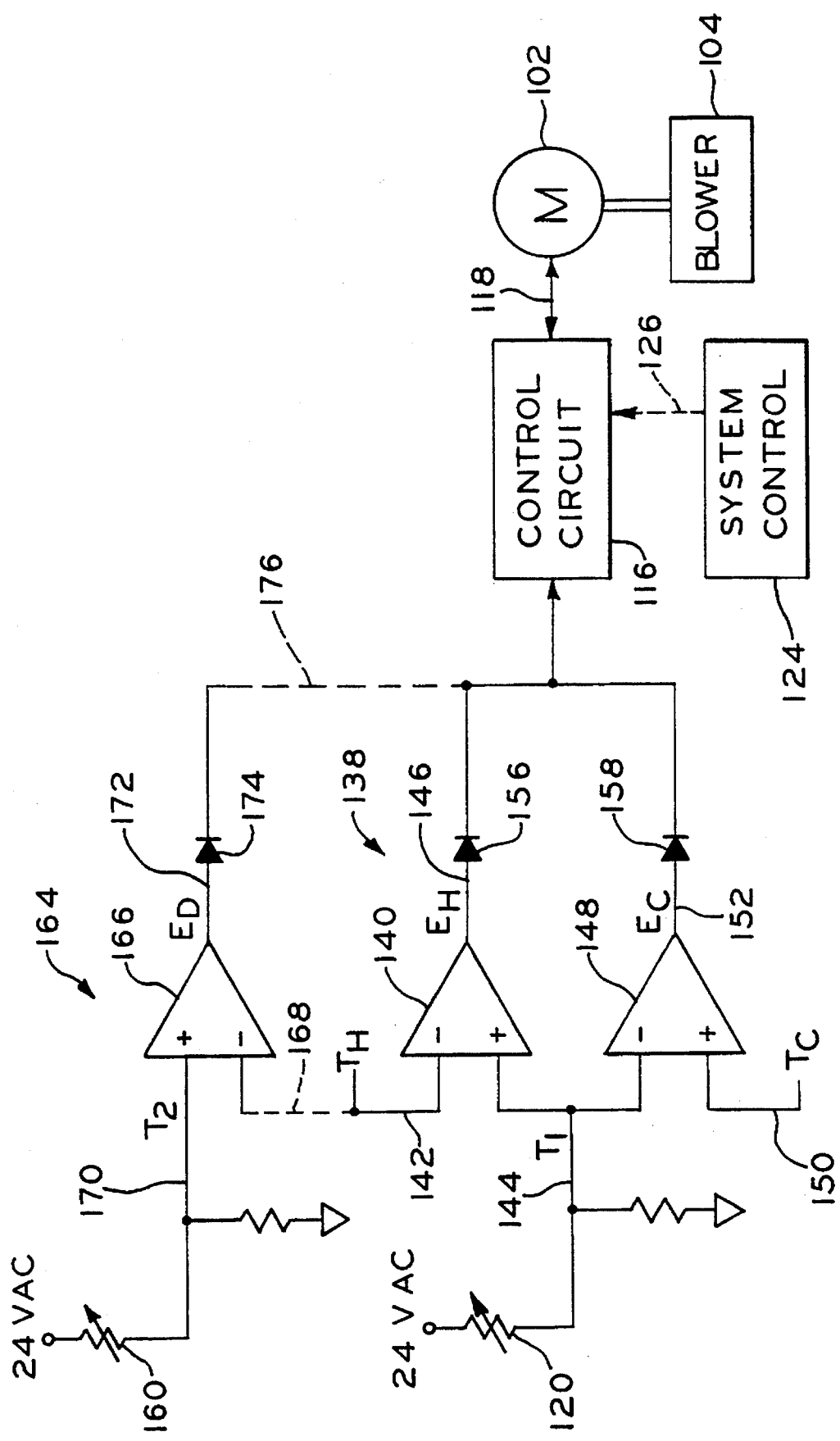

SYSTEM AND METHODS FOR DRIVING A BLOWER WITH A MOTOR

CROSS-REFERENCE TO RELATED APPLICATION

This application is a continuation-in-part of U.S. patent application Ser. No. 07/889,708, filed May 27, 1992 (pending), which is commonly assigned with the present application and the entire disclosure of which is incorporated herein by reference in its entirety.

BACKGROUND OF THE INVENTION

This invention generally relates to any electronically controllable motor and to systems, such as heating, ventilating and/or air conditioning (HVAC) systems having motors therein for driving indoor blowers and including a temperature sensor for regulating motor speed or torque.

Presently available motors, such as conventional brush-commutated DC motors, conveniently provide for changing operation speeds. However, there are disadvantages associated with these motors such as brush wear, electrical loss, noise and radio frequency interference caused by sparking between the brushes and the segmented commutator, and overall material cost of the motor. These disadvantages limit the applicability of such motors in many fields, including the refrigeration or HVAC fields. Electronically controlled motors, such as electronically commutated motors including brushless DC motors and permanent magnet motors with electronic commutation, have now been developed and generally are believed to have the advantageous characteristics of brush-commutated DC motors without many of the disadvantages thereof while also having other important advantages. Such electronically commutated motors are disclosed in, for instance, U.S. Pat. Nos. 4,015,182, 4,459,519, 4,642,537, 4,757,241 and 4,806,833, all of which are commonly assigned with the present application and the entire disclosures of which are incorporated herein by reference in their entirety.

Present motors have a variety of features and operational and system parameters which must be adjusted to optimize performance by providing a proper speed/torque characteristic for a particular application. Further, in many system applications, the speed/torque characteristics of the motors must be predictable and repeatable. In addition, it is desirable that motors be operable at the highest reasonably achievable efficiency consistent with mass production techniques. Known present variable speed motors cannot easily achieve this advantage because it has traditionally been impractical or too costly to minimize the variable effect on motor characteristics caused by manufacturing tolerances of the internal components of the motor. Present concepts and arrangements for adjusting a motor for different applications require circuit changes such as multiple variable resistors in the electronic control for the motor or permanent software changes in an electronic control microprocessor. Both of the aforementioned arrangements are disadvantageous because they require a unique model to be built for calibrating a system which cannot be easily changed and can be quite expensive.

In the specific case of HVAC systems, such systems may include a variety of backup heat ratings, operate in a variety of modes, have variable capacities and be installed in a variety of environments. Both the speed and torque of an electric motor, which affect air flow through the system, are affected by the aforementioned variables. Interfacing a control microprocessor with the necessary information to make these changes often requires complex assemblies, creates possible shock hazards and/or limits the number of available variations.

Although programmable motors offer numerous advantages over conventional, nonprogrammable motors, extensive laboratory testing and calibration by original equipment manufacturers is often required to develop the appropriate system characteristics. Constants are programmed into such motors to define the relationship between speed and torque versus air flow. Disadvantageously, tuning these constants can be time-consuming. Further, variations in blower wheels, cabinets, housings, and the like may change the system characteristics necessitating changes in the constants. Each set of constants corresponds to a new "model" which the motor must accommodate. For these reasons, an improved programmable motor is desired which readily accommodates changes in system characteristics to provide optimum and efficient air flow and reduced noise in the system.

SUMMARY OF THE INVENTION

Among the several objects of this invention may be noted the provision of an improved heating, ventilation and/or air conditioning system permitting optimum air flow for maximum comfort and/or efficiency for varied system environments; the provision of such a system which permits controlling the air flow rate of the system by controlling speed or torque of a motor driving an indoor blower; the provision of such a system which permits controlling the motor's speed or torque as a function of the temperature of air being discharged by the blower; the provision of such a system which permits delaying operation of the motor at a normal operating speed or torque until the discharged air heats or cools to a desired temperature; the provision of such a system which permits automatically increasing the air flow rate of the system when the discharged air reaches the desired temperature; the provision of such a system which permits automatically decreasing the air flow rate of the system when the period of heating or cooling has ended; the provision of such a system which permits controlling speed or torque of the motor in response to a system control signal; and the provision of such a system which is economically feasible and commercially practical.

Briefly described, a system embodying aspects of the present invention drives a blower of a heating, ventilating, and/or air conditioning (HVAC) system. The blower discharges heated or cooled air to a space for conditioning the air in the space by changing its temperature. A motor drives the blower at a speed or torque defined by a motor control signal thereby to control air flow rate of the HVAC system. The system includes a temperature sensor generating a temperature signal representative of the temperature of the air discharged to the space by the blower. In response to the temperature signal, a control circuit generates the motor control signal to cause the motor to operate at a minimum speed or torque until the temperature of the discharged air as represented by the temperature signal reaches a reference temperature. After the temperature of the discharged air reaches the reference temperature, the control circuit generates the motor control signal to control the motor speed or torque as a function of the difference between the temperature of the discharged air and the reference temperature whereby the air flow rate of the HVAC system is increased as the temperature difference increases.

In another form, the present invention is directed to a system driving a blower of a heating system. The blower discharges heated air to a space for conditioning the air in the space by changing its temperature. A motor drives the blower at a speed or torque defined by a motor control signal thereby to control air flow rate of the heating system. The system includes a temperature sensor generating a temperature signal representative of the temperature of the heated air discharged to the space by the blower. In response to the temperature signal, a control circuit generates the motor control signal to cause the motor to operate at a minimum speed or torque when the temperature of the discharged air as represented by the temperature signal is less than or equal to a reference temperature. When the temperature of the discharged air is greater than the reference temperature, the control circuit generates the motor control signal to control the motor speed or torque as a function of the difference between the temperature of the discharged air and the reference temperature whereby the air flow rate of the heating system is increased as the temperature of the discharged air increases.

Alternatively, a system according to the present invention drives a blower of a cooling system. The blower discharges cooled air to a space for conditioning the air in the space by changing its temperature. A motor drives the blower at a speed or torque defined by a motor control signal thereby to control air flow rate of the cooling system. The system includes a temperature sensor generating a temperature signal representative of the temperature of the cooled air discharged to the space by the blower. In response to the temperature signal, a control circuit generates the motor control signal to cause the motor to operate at a minimum speed or torque when the temperature of the discharged air as represented by the temperature signal is greater than or equal to a reference temperature. When the temperature of the discharged air is less than the reference temperature, the control circuit generates the motor control signal to control the motor speed or torque as a function of the difference between the temperature of the discharged air and the reference temperature whereby the air flow rate of the cooling system is increased as the temperature of the discharged air decreases.

The invention is also directed to a method of operating a system for driving a blower of an HVAC system. The blower discharges heated or cooled air to a space for conditioning air in the space by changing its temperature. The method includes the step of generating a temperature signal representative of the temperature of the air discharged by the blower. A motor operating at a speed or torque defined by a motor control signal drives the blower thereby to control air flow rate of the HVAC system. The method further includes the steps of generating the motor control signal in response to the temperature signal to cause the motor to operate at a minimum speed or torque until the temperature of the discharged air as represented by the temperature signal reaches a reference temperature and thereafter generating the motor control signal to control the motor speed or torque as a function of the difference between the temperature of the discharged air and the reference temperature. Accordingly, the air flow rate of the HVAC system is increased as the temperature difference increases.

In another form, the invention is directed to a method of operating a system for driving a blower of a heating system. The blower discharges heated air to a space for conditioning air in the space by changing its temperature. The method includes the step of generating a temperature signal representative of the temperature of the heated air discharged by the blower. A motor operating at a speed or torque defined by a motor control signal drives the blower thereby to control air flow rate of the HVAC system. The method further includes the steps of generating the motor control signal to cause the motor to operate at a minimum speed or torque when the temperature of the discharged air as represented by the temperature signal is less than or equal to a reference temperature and generating the motor control signal to control the motor speed or torque as a function of the difference between the temperature of the discharged air and the reference temperature when the temperature of the discharged air is greater than the reference temperature. Accordingly, the air flow rate of the heating system is increased as the temperature of the discharged air increases.

Alternatively, the invention is directed to a method of operating a system for driving a blower of a cooling system. The blower discharges cooled air to a space for conditioning air in the space by changing its temperature. The method includes the step of generating a temperature signal representative of the temperature of the cooled air discharged by the blower. A motor operating at a speed or torque defined by a motor control signal drives the blower thereby to control air flow rate of the HVAC system. The method further includes the steps of generating the motor control signal to cause the motor to operate at a minimum speed or torque when the temperature of the discharged air as represented by the temperature signal is greater than or equal to a reference temperature and generating the motor control signal to control the motor speed or torque as a function of the difference between the temperature of the discharged air and the reference temperature when the temperature of the discharged air is less than the reference temperature. Accordingly, the air flow rate of the cooling system is increased as the temperature of the discharged air decreases.

Alternatively, the invention may comprise various other systems and methods.

Other objects and features will be in part apparent and in part pointed out hereinafter.

BRIEF DESCRIPTION OF THE DRAWINGS

FIG. 3 is a partial schematic diagram of another preferred embodiment of a temperature regulating circuit for a heating and cooling system according to the invention.

Corresponding reference characters indicate corresponding parts throughout the drawings.

DETAILED DESCRIPTION OF THE PREFERRED EMBODIMENTS

Figure 1:
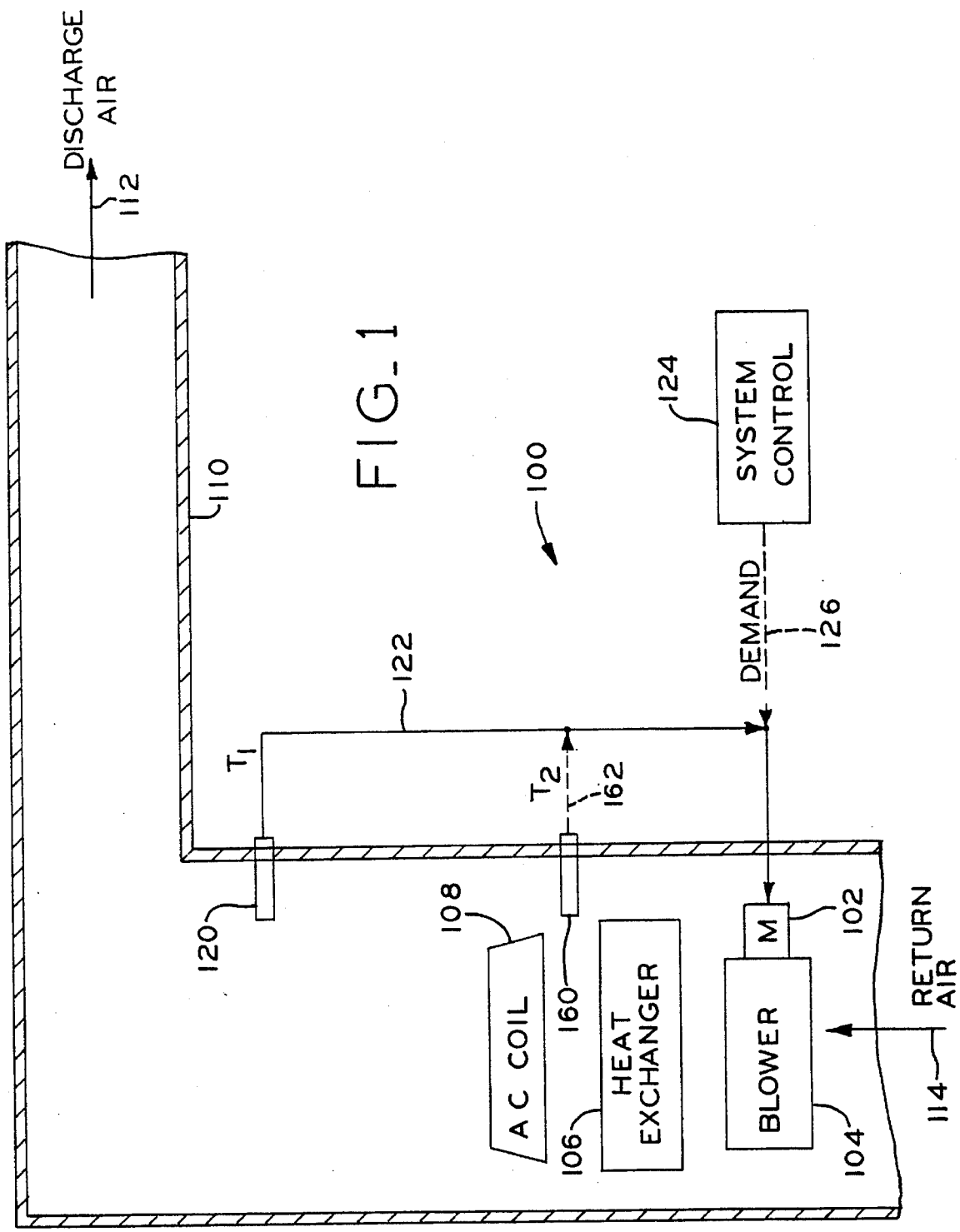
FIG. 1 is a diagrammatic view partially in cross section of a system for conditioning air in accordance with one preferred embodiment of the invention, and illustrating various components in block diagram form.

Referring to FIG. 1, a system 100 according to a preferred embodiment of the present invention is part of an indoor unit of a heating, ventilating or air conditioning (HVAC) system. The HVAC system conditions air in a space (not shown) by moving the air or by heating or cooling the air to change its temperature. System 100 includes a motor 102 for driving a blower 104 which discharges air heated by a heat exchanger 106 or cooled by an air conditioner coil 108. The blower 104 discharges the heated or cooled air through a duct 110 to the space in the direction shown generally by arrow 112. Air from the space is preferably returned to the HVAC system in the direction shown generally by arrow 114.

Referring to FIG. 1, a portion of an HVAC system, such as a gas furnace with air conditioning, according to the invention is shown. The present invention is also suitable for other HVAC systems, such as air handlers having a blower positioned between an air conditioning coil and an electric heater or a heat pump similarly configured.

According to the invention, motor 102 is preferably an electronically controllable motor. Such motors include variable speed motors, selectable speed motors having a plurality of finite, discrete speeds and brushless DC motors, including electronically commutated motors and switched reluctance motors. Application Ser. No. 07/889,708, the entire disclosure of which is incorporated herein by reference, describes a suitable electronically commutated motor. A control circuit 116 (see FIGS. 2 and 3) is preferably resident within a housing (not shown) of motor 102. The control circuit 116 generates motor control signals and sends control commands to motor 102 via a line 118 (see FIGS. 2 and 3) and receives speed or torque feedback from motor 102. In a preferred embodiment, motor 102 has a stationary assembly (not shown) and a rotatable assembly (not shown) in magnetic coupling relation to the stationary assembly. The stationary assembly includes windings adapted to be energized in at least one preselected sequence. A set of power switches (not shown), responsive to the control commands at line 118, selectively connect a power supply (not shown) to the windings of motor 102 to provide current to the windings in the preselected sequence to produce an electromagnetic field for rotating the rotatable assembly. The rotatable assembly of motor 102 is coupled to a rotatable component, such as blower 104, for discharging air through the duct 110 to the space.

As described in application Ser. No. 07/889,708, control circuit 116 controls commutation of the windings of motor 102 by generating a commutation signal as a function of the motor control signal. Preferably, the commutation signal includes a series of commutation pulses wherein each pulse causes a corresponding switching event of the power switches. The windings of the stationary assembly are adapted to be commutated in at least one preselected sequence and the power switches selectively provide power to the windings of motor 102 in the preselected sequence. The resulting current in the windings produces an electromagnetic field for rotating the rotatable assembly of motor 102. By controlling the current in the windings, control circuit 116 controls the speed or torque of motor 102 which in turn controls the speed of blower 104.

A preferred commutation scheme for motor 102 involves three-phase excitation wherein two switches of a six-switch inverter bridge (not shown) are conducting during each motoring interval, one from an upper set of switches and one from a lower set of switches. Current flows in only two of the three phases of motor 102 during each commutation interval. Control circuit 116 provides pulse width modulation (PWM) control of the power to the windings by turning on and off one of the two conducting power switches. In this manner, the duty cycle of the PWM control determines the level of energization in the windings and, thus, determines the speed or torque of motor 102.

In addition, control circuit 116 preferably includes a programmable, non-volatile (PNV) memory (not shown) for storing various system parameters which may be used to determine operation of motor 102. A microprocessor (not shown) is associated with the PNV memory storing parameters representative of the system such as time constants which are a function of the thermal mass of the structure being heated and/or cooled by the indoor unit of the HVAC system.

In a preferred embodiment of the invention, a temperature sensor 120 positioned remotely from the heat exchanger 106 and/or the air conditioner coil 108 and/or directly in the discharge air stream. Preferably, the temperature sensor 120 is a substantially linear temperature sensitive resistor connected to a 24 VAC voltage source. The voltage across the resistor varies with increases and decreases in the temperature of the discharge air. In this manner, temperature sensor 120 generates a temperature signal $T_1$ representative of the temperature of the discharged air. According to the invention, motor 102 drives blower 104 at a speed or torque defined by a motor control signal as a function of the temperature signal $T_1$ thereby to control the HVAC system's air flow rate.

Control circuit 116 receives the temperature signal $T_1$ via line 122 from temperature sensor 120 and generates the motor control signal in response thereto. The motor control signal causes motor 102 to initially operate in a first operating mode. The first operating mode is defined as operation at a preset and/or minimum speed or torque and continues until the temperature of the discharged air as represented by the temperature signal $T_1$ reaches a preset and/or reference temperature as represented by a signal $T_{REF}$. Generally, $T_{REF}$ represents a desired temperature of the discharged air programmed in the memory of control circuit 116. Depending on whether the HVAC system is heating or cooling the air in the space, the reference temperature is either a heating reference or a cooling reference.

As described in detail below, after the temperature of the discharged air has reached the reference temperature, control circuit 116 generates the appropriate motor control signal to operate motor 102 in a second operating mode. In the second operating mode, control circuit 116 controls the speed or torque of motor 102 as a function of the difference between the temperature of the discharged air and the reference temperature. In this manner, the air flow rate of the HVAC system is increased as the difference between $T_1$ and $T_{REF}$ increases after the temperature of the discharged air has reached the reference temperature.

Referring further to FIG. 1, a system control 124, such as a conventional thermostat, generates a two state system control signal. The system control signal preferably has a DEMAND state and a NO DEMAND state, each state corresponding to a difference between the temperature of the air in the space and a set point temperature. Thus, the DEMAND and NO DEMAND states are responsive to the temperature of the air space as it rises and falls.

Control circuit 116, embodied as a microprocessor or the like, may receive the system control signal via line 126. The DEMAND state of the system control signal instructs control circuit 116 to generate the appropriate motor control signal for operating motor 102 in the first operating mode and causes heat exchanger 106 or air conditioner coil 108 to change the temperature of the air.

As described in application Ser. No. 07/889,708, the microprocessor of control circuit 116 may be responsive to a number of system control signals provided by system control 124. Various system control signals include a thermostat signal, a blower activating command, a defrost signal, an electric heat command, first and second stage compressor commands, a reversing valve command and a humidistat low humidity signal. Control circuit 116 preferably defines an operating mode for motor 102 in response to the system control signals.

Figure 2:
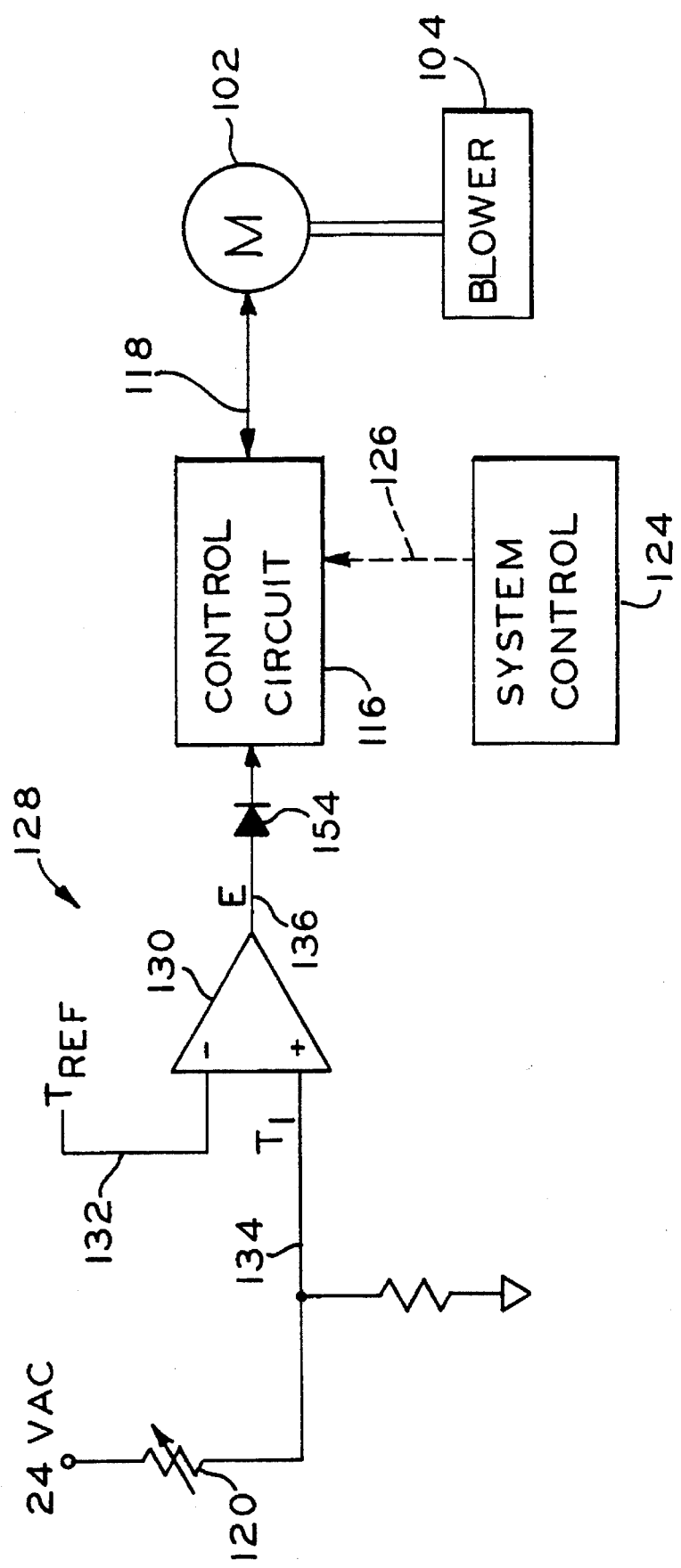
FIG. 2 is a partial schematic diagram of one preferred embodiment of a temperature regulating circuit for a heating or cooling system according to the invention.

Referring to FIG. 2, the invention for a typical operating cycle is shown. A temperature regulation circuit 128 compares the temperature signal $T_1$ to the reference signal $T_{REF}$ thereby to determine a temperature difference between the actual temperature of the air discharged by blower 108 and its desired temperature. In a preferred embodiment, the temperature regulation circuit 128 comprises a differential amplifier 130 which receives the reference signal $T_{REF}$ via line 132. The differential amplifier 130 also receives the temperature signal $T_1$ via line 134 from temperature sensor 120 and compares the two signals. The resulting amplified error signal E at line 136 is used to drive control circuit 116 of motor 102.

As an example, the HVAC system is delivering heat to the space. In general, the temperature of the discharged air, as represented by the temperature signal $T_1$, is initially at room temperature. In response to the DEMAND signal from system control 124, heat exchanger 106 begins heating and control circuit 116 generates the appropriate motor control signal to cause motor 102 to begin running. Motor 102 begins operation in the first operating mode at the minimum speed or torque. The first operating mode represents continuous fan levels of air flow. As heat exchanger 106 heats up, and as air flows across temperature sensor 120, sensor 120 signals an increasing temperature of the discharged air. As is known in the art, the temperature rise of the discharge air is directly proportional to the heat provided to the air (or extracted from the air during cooling) and inversely proportional to the air flow rate of the discharged air. Therefore, the discharged air heats or cools relatively quickly in the first operating mode.

The reference signal $T_{REF}$ can represent a heating reference signal $T_H$ corresponding to a heating reference temperature when the HVAC system is delivering heated air to the space. Once the temperature represented by the temperature signal $T_1$ reaches the programmed heating reference temperature represented by the signal $T_H$, the temperature error signal E causes control circuit 116 to increase the speed or torque of motor 102. Thus, increased air flow is delivered to the space. As a result, however, the temperature rise slows. Motor 102 continues to operate in the second operating mode and eventually the increased air flow rate is sufficient to maintain the discharged air temperature at the programmed temperature. In the alternative, the speed or torque of motor 102 maintains the discharged air temperature at a predetermined temperature difference above the heating reference temperature.

In a similar manner, $T_{REF}$ can represent a cooling reference signal $T_C$ corresponding to a cooling reference temperature when the HVAC system is delivering cooled air to the space. In such an embodiment, temperature regulation circuit 128 of FIG. 2 may be modified by reversing the inputs to differential amplifier 130 to generate the error signal E when the temperature represented by the signal $T_1$ reaches the cooling reference represented by the signal $T_C$.

In a preferred embodiment of the invention, the temperature signal $T_1$ levels out at a maximum temperature difference above the heating reference temperature represented by the signal $T_H$ or a maximum temperature difference below the cooling reference temperature represented by the signal $T_C$. In this manner, the present invention gradually ramps motor speed or torque as the temperature of the discharged air reaches its maximum or minimum value so that audible noise in the system is reduced and efficiency is maximized.

FIG. 3 illustrates a preferred temperature regulation circuit 138 for automatically sensing whether heating or cooling is required. The temperature regulation circuit 138 compares the temperature signal $T_1$ to the heating reference signal $T_H$ and to the cooling reference signal $T_C$ thereby to determine a temperature difference between the actual temperature of the air discharged by blower 108 and its desired temperature. In this embodiment, temperature regulation circuit 138 comprises a first differential amplifier 140 which receives the reference signal $T_H$ via line 142. The differential amplifier 140 also receives the temperature signal $T_1$ via line 144 from temperature sensor 120 and compares the two signals. The resulting amplified error signal $E_H$ at line 146 represents the difference between the sensed temperature of the discharged air and the heating reference temperature. Temperature regulation circuit 138 further comprises a second differential amplifier 148 which receives the reference signal $T_C$ via line 150. The differential amplifier 148 also receives the temperature signal $T_1$ via line 144 from temperature sensor 120 and compares the two signals. The resulting amplified error signal $E_C$ at line 152 represents the difference between the sensed temperature of the discharged air and the cooling reference temperature. Control circuit 116 receives the error signals $E_H$ and $E_C$ for controlling the speed or torque of motor 102.

Referring further to FIG. 2, differential amplifier 130 preferably maintains negative saturation until $T_1$ exceeds $T_{REF}$. Similarly in FIG. 3, differential amplifier 140 maintains negative saturation until T exceeds T and differential amplifier 148 maintains negative saturation until $T_1$ falls below $T_C$. For this reason, temperature regulation circuit 128, 138 includes a limiting circuit for clipping the negative saturation. For example, a series diode 154 limits the output of differential amplifier 130 at line 136, i.e., the error signal E, to a positive value or zero. Likewise, a series diode 156 limits the output of differential amplifier 140 at line 146, i.e., the error signal $E_H$, to a positive value or zero and a series diode 158 limits the output of differential amplifier 148 at line 152, i.e., the error signal $E_C$, to a positive value or zero. It is to be understood that various other limiting circuits could be employed to clip or clamp the output of differential amplifiers 130 and 140, 148 as required by the particular application of the present invention.

According to the invention, the amount of overshoot in system 100 is a function of the gain of differential amplifier 130. In other words, the gain translates to a maximum temperature difference above the heating reference and a maximum temperature difference below the cooling reference. As such, the gain is used to preselect the number of degrees in error translating to full speed operation. A large gain causes the discharged air temperature to level out at approximately the reference temperature and, if the gain is relatively small, the temperature levels out at a predetermined temperature greater than the heating reference or less than the cooling reference. For example, if 10 V is desired to drive the PWM generator of control circuit 116 for full speed operation of motor 102, then the gain of differential amplifier 130 is selected so that differential amplifier 130 outputs 2 V when the temperature rises 1° above the heating reference or 1° below the cooling reference. In this embodiment, 2 V corresponds to a duty cycle of 20% of full speed.

Further, since control circuit 116 controls motor 102 as a function of the difference between the temperature of the discharged air and the respective reference temperature in the second operating mode, the speed of blower 104 will be automatically ramped down when system control 124 causes the HVAC system to discontinue heating or cooling the air. Thus, system 100 of the present invention provides maximum efficiency and reduces audible noise during its operation.

As an example, if the HVAC system includes a gas furnace, the maximum temperature rise is typically 65°. If the heat exchanger of the furnace does not get hot enough, condensation may form which can damage the heat exchanger. Conversely, if the temperature of the discharge air is too great, then a risk of overheating or burning up of the furnace exists. An exemplary $T_H$ corresponds to 140° F. and an exemplary $T_C$ corresponds to 55° F. Overshoot is preferably limited to 5° to 15° so that the maximum temperature is approximately 150° and the minimum temperature is approximately 45°.

In a similar manner, the gain of differential amplifier 140 and of differential amplifier 148 controls the maximum allowable deviation in temperature above the heating reference or below the cooling reference.

It is to be understood that those skilled in the art may envision many analog and digital schemes for processing the error signals in accordance with the present invention. Control circuit 116 of motor 102 preferably includes an internal analog-to-digital converter (not shown) for converting incoming analog signals into digital signals for further processing.

As described above, control circuit 116 is responsive to the system control signal from system control 124 to turn on heat exchanger 106 or air conditioner 108 and to begin running motor 102 at the minimum speed or torque until the discharged air reaches a desired temperature. As such, efficiency is optimized. In the alternative, motor 102 continuously drives blower 104 at the minimum speed or torque regardless of the DEMAND state. Control circuit 116 only causes the speed or torque of motor 102 to vary after the temperature signal $T_1$ exceeds the heating reference signal $T_H$ or falls below the cooling reference signal $T_C$. This alternative embodiment is particularly well-suited to be retrofitted in an existing HVAC system and provides simplified installation and minimum connections.

By driving blower 104 at the minimum speed or torque, whether continuously or in response to the system control signal, temperature sensor 120 can be positioned a distance away from heat exchanger 106 and/or air conditioner 108. For example, temperature sensor 120 is four or five feet away from heat exchanger 106. Without air flow in duct 110, temperature sensor 120 would be unable to sense that the HVAC system has been turned on. In an alternative embodiment, temperature sensor 120 is positioned closer to motor 102 or in the housing of motor 102. Positioning temperature sensor 120 near motor 102 provides ease of installation and manufacture of system 100 and is suitable for use with heat pumps and other applications.

Figures 4A, 4B:
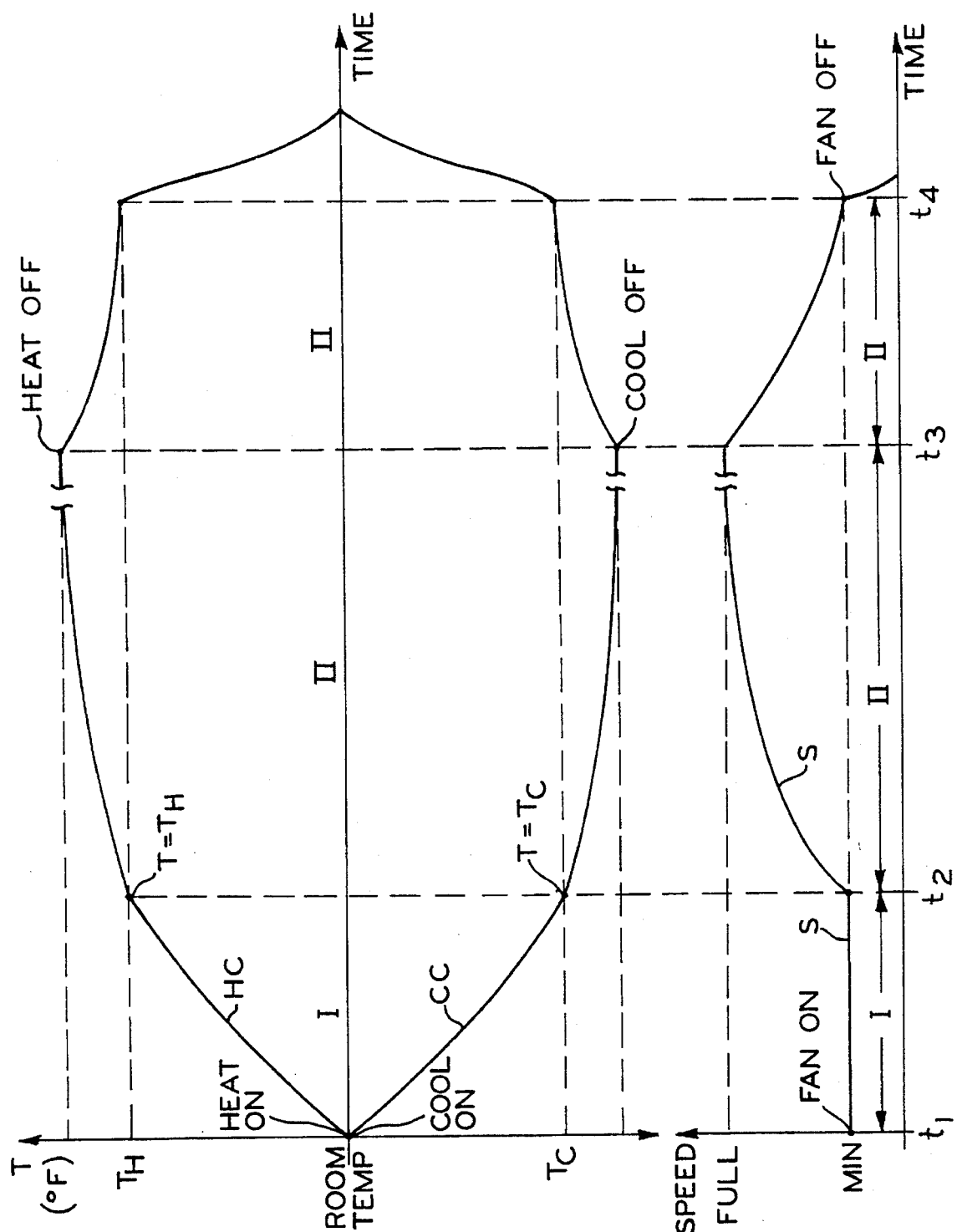
FIG. 4 is a timing diagram illustrating the relationship of blower speed and temperature of one preferred embodiment of the invention.

FIG. 4(a) illustrates exemplary temperature curves versus time for a heating cycle HC and a cooling cycle CC of an HVAC system including system 100 of the present invention. FIG. 4(b) illustrates an exemplary speed curve S versus time which is interrelated to the temperature curves. In each of FIGS. 4(a) and 4(b), I indicates operation in the first operating mode and II indicates operation in the second operating mode.

In a preferred embodiment of the invention, such as illustrated in FIG. 3, system control 124 commands either heat exchanger 106 or air conditioner 108 on at time $t_1$. Motor 102 operates in the first operating mode to drive blower 104 at the minimum speed until time $t_2$. As shown by the heating cycle HC, the temperature of the discharged air represented by the signal $T_1$ reaches the heating reference temperature represented by the signal $T_H$ at time $t_2$. In the alternative, the temperature of the discharged air represented by the signal $T_1$ reaches the cooling reference temperature represented by the signal $T_C$ at time $t_2$ as shown by the cooling cycle CC. Beginning at $t_2$, motor 102 operates in the second operating mode until blower 104 is commanded off at time $t_4$. FIGS. 4(a) and 4(b) further show a time $t_3$ when system control 124 commands heat exchanger 106 or air conditioner 108 off. At this time $t_3$, the temperature of the discharged air decreases and the speed or torque of motor 102, operating as a function of the signal $T_1$, decreases accordingly. Between $t_3$ and $t_4$, the temperature signal $T_1$ decreases until it again reaches $T_H$ or increases until it again reaches $T_c$. According to one preferred embodiment of the invention, control circuit 116 commands motor 102 off at $t_4$. In the alternative, motor 102 returns to the first operating mode at t and operates at the minimum speed or torque.

The excellent programming features of the motor disclosed in application Ser. No. 07/889,708 allow original equipment manufacturers to preselect appropriate reference temperatures corresponding to their equipment. According to the present invention, no special knowledge of the blower wheel or blower constants is required. In this manner, system 100 provides the most accurate air flow for the HVAC system, automatically compensates for changes in static pressure and blower wheels, and automatically provides optimum ramping up/down of blower speed. In other words, system 100 discharges air to the space at the desired temperature in the most efficient manner possible.

Referring again to FIG. 1, a second temperature sensor 160 similar to temperature sensor 120 is shown in phantom. The temperature sensor 160 generates a second temperature signal $T_2$ at line 162. In an alternative embodiment, system 100 is part of a heat pump system. As is known in the art, heat pumps are susceptible to freezing if certain conditions exist. For example, if a heat pump is operating to heat a space, i.e., it is extracting heat from air before it is discharged to the outside, and the outside air temperature is very cold, condensation can form on the coils of the outside unit of the heat pump. This condensation can freeze causing damage to the heat pump.

A conventional heat pump includes a sensor for detecting such freezing conditions. In response to a detected freezing condition, the heat pump generates appropriate signals for operating in a defrost mode. In the defrost mode, the heat pump essentially operates as an air conditioner to discharge heated air to the outside unit to thaw the frozen coils. However, to prevent cold air from being discharged to the inside space, the heat pump also operates in a heating mode by running its back-up heat exchanger or furnace. In this alternative embodiment of the invention, temperature sensor 160 is positioned near heat exchanger 106 as shown diagrammatically in FIG. 1. If temperature signals $T_1$ and $T_2$ are substantially similar, it indicates that system 100 is operating in a standard heating mode. On the other hand, if signals $T_1$ and $T_2$ are different, it indicates that system 100 is operating in a defrost mode. In the defrost mode, signal $T_2$ is representative of heat exchanger 106 heating the air and signal $T_1$ is representative of air conditioner 108 cooling the air. Thus, blower 104 discharges heated and cooled air to the space which is at a much lower temperature than the temperature measured by temperature sensor 160.

Referring again to FIG. 3, an override circuit 164 is shown connected in phantom to temperature regulation circuit 138.

According to this alternative embodiment of the invention, the override circuit 164 comprises a differential amplifier 166 which receives the reference signal $T_H$ via line 168 (shown in phantom connecting temperature regulation circuit 138 and override circuit 164). The differential amplifier 166 also receives the temperature signal $T_2$ via line 170 from temperature sensor 160 and compares the two signals. The resulting amplified error signal $E_D$ at line 172 represents the difference between the sensed temperature of the air heated by heat exchanger 106 and the heating reference temperature. In an alternative embodiment, such as a heat pump system having an electric heat backup, $E_D$ represents the difference between the sensed temperature of the air cooled by the air conditioner coil 108 and the cooling reference temperature.

As described above with respect to temperature regulation circuit 138, a series diode 176 limits the output of differential amplifier 166 at line 172, i.e., the error signal $E_D$, to a positive value or zero. A line 176 (shown in phantom connecting temperature regulation circuit 138 and override circuit 164) combines the resulting error signals $E_D$ and $E_H$ output by differential amplifiers 166 and 140, respectively. As such, the error signal $E_D$ overrides the error signal $E_H$ and causes control circuit 116 to increase the speed or torque of motor 102. Thus, blower 104 delivers increased air flow to the space even though the heat pump system is operating in the defrost mode.

In yet another alternative embodiment, system control 124 provides via line 126 an override signal, such as a defrost mode signal generated by the heat pump in a defrost mode. In such an embodiment, the override signal causes control circuit 116 to drive motor 102 at approximately full speed or torque during the defrost mode.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A system for driving a blower of a heating, ventilating, and/or air conditioning (HVAC) system, said blower discharging heated or cooled air through a discharge air path to a space thereby to condition air in the space by changing its temperature, said system comprising:

a temperature sensor positioned in the discharge air path, said temperature sensor generating a temperature signal representative of the temperature of the air discharged to the space by the blower;

a motor having first and second operating modes driving the blower at a speed or torque defined by a motor control signal thereby to control air flow rate of the HVAC system said motor operating at a minimum speed or torque in the first operating mode and operating at a variable speed or torque greater than or equal to the minimum speed or torque in the second operating mode; and a control circuit generating the motor control signal in response to the temperature signal to cause the motor to operate in the first operating mode until the temperature of the discharged air as represented by the temperature signal reaches a reference temperature, said control circuit thereafter generating the motor control signal to cause the motor to operate in the second operating mode, said variable motor speed or torque of the second operating mode being a function of the difference between the temperature of the discharged air and the reference temperature, said motor maintaining the air flow rate of the HVAC system substantially constant in the first operating mode and increasing the air flow rate of the HVAC system as the temperature difference increases in the second operating mode.

2. The system of claim 1 wherein the HVAC system includes a heat exchanger for changing the temperature of the air discharged to the space by the blower, and wherein the temperature sensor is positioned remotely from the heat exchanger.

3. The system of claim 1 further comprising a temperature regulation circuit for generating an error signal representative of the difference between the temperature of the discharged air and the reference temperature, and wherein said control circuit has an input for receiving the error signal, said control circuit generating the motor control signal as a function of the error signal.

4. The system of claim 3 wherein the temperature regulation circuit comprises a differential amplifier circuit for comparing the temperature signal and a signal representing the reference temperature thereby to generate the error signal, said differential amplifier circuit including a limiting circuit to limit the error signal such that when the HVAC system is heating the discharged air the motor control signal is limited to increase the speed or torque of the motor as a function of the error signal when the temperature of the discharged air is increasing above the reference temperature and is limited to decrease the speed or torque of the motor as a function of the error signal when the temperature of the discharge air is decreasing above the reference temperature.

5. The system of claim 3 wherein the temperature regulation circuit comprises a differential amplifier circuit for comparing the temperature signal and a signal representing the reference temperature thereby to generate the error signal, said differential amplifier circuit including a limiting circuit to limit the error signal such that when the HVAC system is cooling the discharged air the motor control signal is limited to increase the speed or torque of the motor as a function of the error signal when the temperature of the discharged air is decreasing below the reference temperature and is limited to decrease the speed or torque of the motor as a function of the error signal when the temperature of the discharge air is increasing below the reference temperature.

6. The system of claim 3 wherein the HVAC system comprises a heat pump system having a heating mode, a cooling mode and a defrost mode, and further comprising an override circuit generating an override signal when the heat pump system operates in the defrost mode, said control circuit receiving and responsive to the override signal for generating the motor control signal to cause the motor to operate at a speed or torque greater than the minimum speed or torque whereby the motor operates above the minimum speed or torque and independently of the difference between the temperature of the discharged air and the reference temperature when the heat pump system is operating in the defrost mode.

7. The system of claim 6 wherein the heat pump system includes a heat exchanger for heating the air discharged to the space by the blower, said temperature sensor being positioned remotely from the heat exchanger, and wherein the override circuit includes an additional temperature sensor positioned adjacent the heat exchanger generating an additional temperature signal representative of the temperature of the air adjacent the heat exchanger and includes a differential amplifier circuit for comparing the additional temperature signal and a signal representing the reference temperature thereby to generate the override signal, said control circuit receiving and responsive to the override signal for generating the motor control signal as a function of the difference between the temperature of the air adjacent the heat exchanger and the reference temperature when the heat pump system is operating in the defrost mode.

8. The system of claim 3 wherein the motor has a stationary assembly and a rotatable assembly in magnetic coupling relation thereto, the stationary assembly including windings adapted to be energized in at least one preselected sequence, the rotatable assembly being in driving relation to the blower, and further comprising power switching devices responsive to the motor control signal for selectively connecting a power supply to the windings in the preselected sequence to produce an electromagnetic field for rotating the rotatable assembly at a desired motor speed or torque, said motor control signal being a pulse width modulated signal representative of the desired motor speed or torque and having a duty cycle corresponding to a desired level of energization of the windings thereby to control the speed or torque of the motor, the duty cycle of the motor control signal being a function of the magnitude of the error signal.

9. The system of claim 8 wherein the HVAC system comprises a system for heating the discharged air and wherein the temperature regulation circuit has a gain, said control circuit defining a maximum temperature of the discharged air greater than the reference temperature as a function of the gain, the difference between the maximum temperature and the reference temperature corresponding to a maximum duty cycle of the motor control signal.

10. The system of claim 8 wherein the HVAC system comprises a system for cooling the discharged air and wherein the temperature regulation circuit has a gain, said control circuit defining a minimum temperature of the discharged air less than the reference temperature as a function of the gain, the difference between the minimum temperature and the reference temperature corresponding to a maximum duty cycle of the motor control signal.

11. The system of claim 1 wherein the HVAC system comprises a system for heating the discharged air having a first heating mode and a second heating mode, said first heating mode being defined by the temperature of the discharged air being less than or equal to the reference temperature, said second heating mode being defined by the temperature of the discharged air being greater than the reference temperature, said first and second heating modes corresponding to the first and second operating modes of the motor, respectively, whereby the air flow rate of the HVAC system is increased or decreased as the temperature of the discharged air increases or decreases, respectively.

12. The system of claim 1 wherein the HVAC system comprises a system for cooling the discharged air having a first cooling mode and a second cooling mode, said first cooling mode being defined by the temperature of the discharged air being greater than or equal to the reference temperature, said second cooling mode being defined by the temperature of the discharged air being less than the reference temperature, said first and second cooling modes corresponding to the first and second operating modes of the motor, respectively, whereby the air flow rate of the HVAC system is increased or decreased as the temperature of the discharged air decreases or increases, respectively.

13. The system of claim 1 wherein the HVAC system includes a system control generating a two state system control signal in response to the temperature of the air in the space, said system control signal having a DEMAND state and a NO DEMAND state, each said state corresponding to a difference between the temperature of the air in the space and a set point temperature, and wherein the control circuit is responsive to the DEMAND state of the system control signal for initially generating the motor control signal to cause the motor to operate in the first operating mode and, after the temperature of the discharged air reaches the reference temperature, generating the motor control signal to cause the motor to operate in the second operating mode.

14. The system of claim 13 wherein the HVAC system comprises a heat pump system having a heating mode, a cooling mode and a defrost mode, said system control circuit generating an override signal when the heat pump system operates in the defrost mode, said control circuit receiving and responsive to the override signal for generating the motor control signal to cause the motor to operate at a maximum speed or torque.

15. A heating, ventilating, and/or air conditioning (HVAC) system comprising:

a heat exchanger for heating or cooling air;

a blower for discharging heated or cooled air through a discharge air path to a space thereby to condition air in the space by changing its temperature;

a temperature sensor positioned in the discharge air path remotely from the heat exchanger, said temperature sensor generating a temperature signal representative of the temperature of the air discharged to the space by the blower;

a motor having first and second operating modes driving the blower at a speed or torque defined by a motor control signal thereby to control air flow rate of the HVAC system, said motor operating at a minimum speed or torque in the first operating mode and operating at a variable speed or torque greater than or equal to the minimum speed or torque in the second operating mode; and a control circuit generating the motor control signal in response to the temperature signal to cause the motor to operate in the first operating mode until the temperature of the discharged air as represented by the temperature signal reaches a reference temperature, said control circuit thereafter generating the motor control signal to cause the motor to operate in the second operating mode, said variable motor speed or torque of the second operating mode being a function of the difference between the temperature of the discharged air and the reference temperature, said motor maintaining the air flow rate of the HVAC system substantially constant in the first operating mode and increasing the air flow rate of the HVAC system as the temperature difference increases in the second operating mode.

16. A motor having first and second operating modes for driving a blower of a heating, ventilating, and/or air conditioning (HVAC) system, said blower discharging heated or cooled air through a discharge air path to a space thereby to condition air in the space by changing its temperature, said HVAC system having a temperature sensor positioned in the discharge air path, said temperature sensor generating a temperature signal representative of the temperature of the air discharged to the space by the blower, said motor comprising:

a stationary assembly and a rotatable assembly in magnetic coupling relation thereto, the stationary assembly including windings adapted to be energized in at least one preselected sequence, the rotatable assembly being in driving relation to the blower;

power switching devices responsive to a motor control signal for selectively connecting a power supply to the windings in the preselected sequence to produce an electromagnetic field for rotating the rotatable assembly at a desired motor speed or torque thereby to control air flow rate of the HVAC system, said rotatable assembly rotating at a minimum speed or torque in the first operating mode and rotating at a variable motor speed or torque greater than or equal to the minimum speed or torque in the second operating mode; and a control circuit generating the motor control signal in response to the temperature signal to cause the motor to operate in the first operating mode until the temperature of the discharged air as represented by the temperature signal reaches a reference temperature, said control circuit thereafter generating the motor control signal to cause the motor to operate in the second operating mode, said variable motor speed or torque of the second operating mode being a function of the difference between the temperature of the discharged air and the reference temperature, said motor maintaining the air flow rate of the HVAC system substantially constant in the first operating mode and increasing the air flow rate of the HVAC system as the temperature difference increases in the second operating mode.

17. The motor of claim 16 wherein the HVAC system comprises a heat pump system having a heating mode, a cooling mode and a defrost mode, and wherein the control circuit includes a circuit receiving and responsive to an override signal for generating the motor control signal to cause the motor to operate at a speed or torque greater than the minimum speed or torque when the heat pump system operates in the defrost mode.

18. A method of operating a system for driving a blower of a heating, ventilating, and/or air conditioning (HVAC) system, said blower discharging heated or cooled air through a discharge air path to a space thereby to condition air in the space by changing its temperature, said method comprising:

positioning a temperature sensor in the discharge air path for sensing the temperature of the air discharged to the space by the blower;

generating a temperature signal representative of the sensed temperature of the air discharged by the blower;

driving the blower with a motor having first and second operating modes and operating at a speed or torque defined by a motor control signal thereby to control air flow rate of the HVAC system, said motor operating at a minimum speed or torque in the first operating mode and operating at a variable speed or torque greater than or equal to the minimum speed or torque in the second operating mode;

maintaining the air flow rate of the HVAC system substantially constant until the temperature of the discharged air as represented by the temperature signal reaches a reference temperature by generating the motor control signal to cause the motor to operate in the first operating mode; and thereafter increasing the air flow rate of the HVAC system as the difference between the temperature of the discharged air and the reference temperature increases by generating the motor control signal to cause the motor to operate in the second operating mode, said variable motor speed or torque of the second operating mode being a function of the temperature difference.

19. The method of claim 18 wherein the HVAC system includes a heat exchanger for changing the temperature of the air discharged by the blower and wherein the step of positioning the temperature sensor in the discharge air path comprises the steps of positioning the temperature sensor remotely from the heat exchanger and sensing the temperature of the discharged air thereby to generate the temperature signal.

20. The method of claim 18 further comprising the steps of generating an error signal representative of the difference between the temperature of the discharged air and the reference temperature with a temperature regulation circuit and generating a motor control signal for defining the speed or torque of the motor as a function of the error signal.

21. The method of claim 20 further comprising the steps of comparing the temperature signal and a signal representing the reference temperature thereby to generate the error signal and limiting the error signal such that when the HVAC system is heating the discharged air the motor control signal is limited to increase the speed or torque of the motor as a function of the error signal when the temperature of the discharged air is increasing above the reference temperature and the motor control signal is limited to decrease the speed or torque of the motor as a function of the error signal when the temperature of the discharge air is decreasing above the reference temperature.

22. The method of claim 20 further comprising the steps of comparing the temperature signal and a signal representing the reference temperature thereby to generate the error signal and limiting the error signal such that when the HVAC system is cooling the discharged air the motor control signal is limited to increase the speed or torque of the motor as a function of the error signal when the temperature of the discharged air is decreasing below the reference temperature and the motor control signal is limited to decrease the speed or torque of the motor as a function of the error signal when the temperature of the discharge air is increasing below the reference temperature.

23. The method of claim 20 wherein the HVAC system comprises a heat pump system having a heating mode, a cooling mode and a defrost mode, and further comprising the steps of generating an override signal when the heat pump system operates in the defrost mode and generating the motor control signal in response to the override signal to cause the motor to operate at a speed or torque greater than the minimum speed or torque whereby the motor operates above the minimum speed or torque and independently of the difference between the temperature of the discharged air and the reference temperature when the heat pump system is operating in the defrost mode.

24. The method of claim 23 wherein the heat pump system includes a heat exchanger for heating the air discharged to the space by the blower and further comprising the steps of generating an additional temperature signal representative of the temperature of the air adjacent the heat exchanger, comparing the additional temperature signal and a signal representing the reference temperature thereby to generate the override signal, and generating the motor control signal in response to the override signal as a function of the difference between the temperature of the air adjacent the heat exchanger and the reference temperature when the heat pump system is operating in the defrost mode.

25. The method of claim 20 wherein the motor has a stationary assembly and a rotatable assembly in magnetic coupling relation thereto, the stationary assembly including windings adapted to be energized in at least one preselected sequence, the rotatable assembly being in driving relation to the blower, and further comprising the steps of selectively connecting a power supply to the windings in the preselected sequence by switching power switching devices in response to the motor control signal to produce an electromagnetic field for rotating the rotatable assembly at a desired motor speed or torque and pulse width modulating the motor control signal at a duty cycle corresponding to a desired level of energization of the windings thereby to control the speed or torque of the motor, the duty cycle of the motor control signal being a function of the magnitude of the error signal.

26. The method of claim 25 wherein the HVAC system comprises a system for heating the discharged air and wherein the temperature regulation circuit has a gain, and further comprising the step of defining a maximum temperature of the discharged air greater than the reference temperature as a function of the gain, the difference between the maximum temperature and the reference temperature corresponding to a maximum duty cycle of the motor control signal.

27. The method of claim 25 wherein the HVAC system comprises a system for cooling the discharged air and wherein the temperature regulation circuit has a gain, and further comprising the step of defining a minimum temperature of the discharged air less than the reference temperature as a function of the gain, the difference between the minimum temperature and the reference temperature corresponding to a maximum duty cycle of the motor control signal.

28. The method of claim 18 wherein the HVAC system comprises a system for heating the discharged air having a first heating mode and a second heating mode, said first heating mode being defined by the temperature of the discharged air being less than or equal to the reference temperature, said second heating mode being defined by the temperature of the discharged air being greater than the reference temperature, said first and second heating modes corresponding to the first and second operating modes of the motor, respectively, and wherein the step of increasing the air flow rate of the HVAC system comprises increasing or decreasing the air flow rate as the temperature of the discharged air increases or decreases, respectively in the second heating mode.

29. The method of claim 18 wherein the HVAC system comprises a system for cooling the discharged air having a first cooling mode and a second cooling mode, said first cooling mode being defined by the temperature of the discharged air being greater than or equal to the reference temperature, said second cooling mode being defined by the temperature of the discharged air being less than the reference temperature, said first and second cooling modes corresponding to the first and second operating modes of the motor, respectively, and wherein the step of increasing the air flow rate of the HVAC system comprises increasing or decreasing the air flow rate as the temperature of the discharged air decreases or increases, respectively in the second cooling mode.

30. The method of claim 18 wherein the HVAC system includes a system control generating a two state system control signal in response to the temperature of the air in the space, said system control signal having a DEMAND state and a NO DEMAND state, each said state corresponding to a difference between the temperature of the air in the space and a set point temperature, and further comprising initially operating the motor in the first operating mode in response to the DEMAND state of the system control signal and, after the temperature of the discharged air reaches the reference temperature, operating the motor in the second operating mode.

31. The method of claim 30 wherein the HVAC system comprises a heat pump system having a heating mode, a cooling mode and a defrost mode, and further comprising the steps of generating an override signal when the heat pump system operates in the defrost mode and generating the motor control signal in response to the override signal to cause the motor to operate at a maximum speed or torque.

32. A method of operating a heating, ventilating, and/or air conditioning (HVAC) system, said HVAC system having a heat exchanger for heating or cooling air, a blower discharging the heated or cooled air through a discharge air path to a space thereby to condition air in the space by changing its temperature, said method comprising:

positioning a temperature sensor in the discharge air path remotely from the heat exchanger for sensing the temperature of the air discharged to the space by the blower;

generating a temperature signal representative of the sensed temperature of the air discharged to the space by the blower;

driving the blower with a motor having first and second operating modes and operating at a speed or torque defined by a motor control signal thereby to control air flow rate of the HVAC system, said motor operating at a minimum speed or torque in the first operating mode and operating at a variable speed or torque greater than or equal to the minimum speed or torque in the second operating mode;

maintaining the air flow rate of the HVAC system substantially constant until the temperature of the discharged air as represented by the temperature signal reaches a reference temperature by generating the motor control signal to cause the motor to operate in the first operating mode; and thereafter increasing the air flow rate of the HVAC system as the difference between the temperature of the discharged air and the reference temperature increases by generating the motor control signal to cause the motor to operate in the second operating mode said variable motor speed or torque of the second operating mode being a function of the temperature difference.

33. A method of operating a motor having first and second operating modes for driving a blower of a heating, ventilating, and/or air conditioning (HVAC) system, said blower discharging heated or cooled air through a discharge air path to a space thereby to condition air in the space by changing its temperature, said motor having a stationary assembly and a rotatable assembly in magnetic coupling relation thereto, the stationary assembly including windings adapted to be energized in at least one preselected sequence, the rotatable assembly being in driving relation to the blower, said method comprising:

selectively connecting a power supply to the windings in the preselected sequence by switching power switching devices in response to a motor control signal to produce an electromagnetic field for rotating the rotatable assembly at a desired motor speed or torque thereby to control air flow rate of the HVAC system, said rotatable assembly rotating at a minimum speed or torque in the first operating mode and rotating at a variable motor speed or torque greater than or equal to the minimum speed or torque in the second operating mode;

positioning a temperature sensor in the discharge air path for sensing the temperature of the air discharged to the space by the blower;

generating a temperature signal representative of the sensed temperature of the air discharged by the blower;

generating the motor control signal in response to the temperature signal to cause the motor to operate in the first operating mode until the temperature of the discharged air as represented by the temperature signal reaches a reference temperature, said motor operating in the first operating mode maintaining the air flow rate of the HVAC system substantially constant; and thereafter generating the motor control signal to cause the motor to operate in the second operating mode, said motor operating in the second operating mode increasing the air flow rate of the HVAC system as the difference between the temperature of the discharged air and the reference temperature increases, said variable motor speed or torque of the second operating mode being a function of the temperature difference.

34. The method of claim 33 wherein the HVAC system comprises a heat pump system having a heating mode, a cooling mode and a defrost mode, and further comprising the steps of receiving an override signal and generating the motor control signal in response to the override signal to cause the motor to operate at a speed or torque greater than the minimum speed or torque when the heat pump system operates in the defrost mode.

35. The system of claim 1 wherein the HVAC system comprises a system for heating the discharged air and further comprising a temperature regulation circuit for comparing the temperature of the heated discharged air to the reference temperature, and wherein the control circuit is responsive to the temperature regulation circuit for generating the motor control signal to cause the motor to operate in the first operating mode when the temperature of the discharged air is less than or equal to the reference temperature and for generating the motor control signal to cause the motor to operate in the second operating mode when the temperature of the discharged air is greater than the reference temperature whereby the air flow rate of the heating system is increased as the temperature of the discharged air increases above the reference temperature.

36. The system of claim 1 wherein the HVAC system comprises a system for cooling the discharged air and further comprising a temperature regulation circuit for comparing the temperature of the cooled discharged air to the reference temperature, and wherein the control circuit is responsive to the temperature regulation circuit for generating the motor control signal to cause the motor to operate in the first operating mode when the temperature of the discharged air is greater than or equal to the reference temperature and for generating the motor control signal to cause the motor to operate in the second operating mode when the temperature of the discharged air is less than the reference temperature whereby the air flow rate of the cooling system is increased as the temperature of the discharged air decreases below the reference temperature.

37. The system of claim 1 further comprising a temperature regulation circuit for comparing the temperature of the heated or cooled air discharged by the blower to a heating reference temperature and to a cooling reference temperature, and wherein the control circuit is responsive to the temperature regulation circuit for generating the motor control signal to cause the motor to operate in the first operating mode when the temperature of the discharged air is less than or equal to the heating reference temperature and greater than or equal to the cooling reference temperature and for generating the motor control signal to cause the motor to operate in the second operating mode when the temperature of the discharged air is greater than the heating reference temperature or less than the cooling reference temperature whereby the air flow rate of the HVAC system is increased as the temperature of the discharged air increases above the heating reference temperature or decreases below the cooling reference temperature.

38. The method of claim 18 wherein the HVAC system comprises a system for heating the discharged air and further comprising the step of comparing the temperature of the heated discharged air to the reference temperature, and wherein the step of maintaining the air flow rate comprises generating the motor control signal to cause the motor to operate in the first operating mode when the temperature of the discharged air is less than or equal to the reference temperature and the step of increasing the air flow rate comprises generating the motor control signal to cause the motor to operate in the second operating mode when the temperature of the discharged air is greater than the reference temperature whereby the air flow rate of the heating system is increased as the temperature of the discharged air increases above the reference temperature.

39. The method of claim 18 wherein the HVAC system comprises a system for cooling the discharged air and further comprising the step of comparing the temperature of the cooled discharged air to the reference temperature, and wherein the step of maintaining the air flow rate comprises generating the motor control signal to cause the motor to operate in the first operating mode when the temperature of the discharged air is greater than or equal to the reference temperature and the step of increasing the air flow rate comprises generating the motor control signal to cause the motor to operate in the second operating mode when the temperature of the discharged air is less than the reference temperature whereby the air flow rate of the cooling system is increased as the temperature of the discharged air decreases below the reference temperature.

40. The method of claim 18 further comprising the step of comparing the temperature of the heated or cooled air discharged by the blower to a heating reference temperature and to a cooling reference temperature, and wherein the step of maintaining the air flow rate comprises generating the motor control signal to cause the motor to operate in the first operating mode when the temperature of the discharged air is less than or equal to the heating reference temperature and greater than or equal to the cooling reference temperature and the step of increasing the air flow rate comprises generating the motor control signal to cause the motor to operate in the second operating mode when the temperature of the discharged air is greater than the heating reference temperature or less than the cooling reference temperature whereby the air flow rate of the HVAC system is increased as the temperature of the discharged air increases above the heating reference temperature or decreases below the cooling reference temperature.

* * * * *